US010970995B2

(12) United States Patent
Tani et al.

(10) Patent No.: US 10,970,995 B2
(45) Date of Patent: Apr. 6, 2021

(54) SYSTEM FOR MONITORING EVENT RELATED DATA

(71) Applicant: NEC Corporation, Tokyo (JP)

(72) Inventors: Masahiro Tani, Singapore (SG); Takeshi Arikuma, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/354,297

(22) Filed: Mar. 15, 2019

(65) Prior Publication Data

US 2019/0213867 A1 Jul. 11, 2019

Related U.S. Application Data

(63) Continuation of application No. 15/546,717, filed as application No. PCT/JP2016/000783 on Feb. 16, 2016.

(30) Foreign Application Priority Data

Feb. 17, 2015 (SG) .......................... 10201501222X (51) Int. Cl.
*G08B 29/18* (2006.01)
*H04N 7/18* (2006.01)
(Continued)

(52) U.S. Cl.
CPC .......... *G08B 29/188* (2013.01); *G08B 13/19* (2013.01); *G08B 13/19697* (2013.01);
(Continued)

(58) Field of Classification Search
CPC G08B 25/006; G08B 13/19; G08B 13/19697; G02B 15/14; H04N 7/188; H04N 7/18; G01N 33/00
(Continued)

(56) References Cited

U.S. PATENT DOCUMENTS 6,970,183 B1 * 11/2005 Monroe ................. G08B 7/062
348/143
8,260,006 B1 9/2012 Callari et al.
(Continued)

FOREIGN PATENT DOCUMENTS

JP H05-159179 A 6/1993
JP H07-274150 A 10/1995
(Continued)

OTHER PUBLICATIONS

U.S. Office Action for U.S. Appl. No. 15/546,717 dated May 30, 2019.
(Continued)

*Primary Examiner* — Thai Q Tran
*Assistant Examiner* — Syed Y Hasan (57) ABSTRACT

A system for monitoring event related data including a sensor data analyzer, an event analyzer and an actuator is disclosed. The sensor data analyzer detects events based on sensor data, the event analyzer couples to the sensor data analyzer and estimates the size of the detected entire events based on event related data of the detected events from the sensor data analyzer, and the actuator couples to the sensor data analyzer and the event analyzer and actuates a predetermined device based on the estimated size of the detected entire events.

15 Claims, 10 Drawing Sheets

(51) Int. Cl.
    *G08B 13/196*     (2006.01)
    *G08B 25/00*     (2006.01)
    *G08B 13/19*     (2006.01)
    *G08B 17/12*     (2006.01)

(52) U.S. Cl.
    CPC .......... *G08B 25/006* (2013.01); *H04N 7/188* (2013.01); *G08B 13/19643* (2013.01); *G08B 17/125* (2013.01)

(58) Field of Classification Search
    USPC .......................................... 348/143; 359/690
    See application file for complete search history.

(56) References Cited

U.S. PATENT DOCUMENTS

| | | | |
|---|---|---|---|
| 9,781,348 B1 | 10/2017 | Bart et al. | |
| 2006/0056056 A1* | 3/2006 | Ahiska | G08B 13/19608 |
| | | | 359/690 |
| 2009/0028440 A1 | 1/2009 | Elangovan et al. | |
| 2009/0040302 A1 | 2/2009 | Thompson | |
| 2010/0134619 A1 | 6/2010 | Hampapur et al. | |
| 2011/0013018 A1* | 1/2011 | Leblond | G06T 17/05 |
| | | | 348/143 |
| 2011/0235532 A1 | 9/2011 | Alizadeh-Shabdiz et al. | |
| 2012/0131985 A1* | 5/2012 | Brasfield | G01N 33/0001 |
| | | | 73/23.34 |
| 2014/0266699 A1 | 9/2014 | Poder et al. | |
| 2015/0161572 A1 | 6/2015 | Oh et al. | |
| 2015/0206419 A1 | 7/2015 | Johnson et al. | |
| 2017/0237942 A1 | 8/2017 | Arikuma et al. | |
| 2017/0251173 A1 | 8/2017 | Siminoff et al. | |

FOREIGN PATENT DOCUMENTS

| | | |
|---|---|---|
| JP | 2000-083243 A | 3/2000 |
| JP | 2000-092368 A | 3/2000 |
| JP | 2002-158801 A | 5/2002 |
| JP | 2004-078393 A | 3/2004 |
| JP | 2006-186739 A | 7/2006 |
| JP | 2008-507229 A | 3/2008 |
| JP | 2008-097222 A | 4/2008 |
| JP | 2010-232888 A | 10/2010 |
| JP | 2011-076316 A | 4/2011 |
| JP | 2011-217055 A | 10/2011 |
| JP | 2012-043392 A | 3/2012 |
| JP | 2013-196655 A | 9/2013 |
| JP | 2017-539114 A | 12/2017 |
| WO | 2013140671 A1 | 9/2013 |
| WO | 2014/174737 A1 | 10/2014 |

OTHER PUBLICATIONS

International Search Report for PCT Application No. PCT/JP2016/000783, dated May 10, 2016.
English translation of Written opinion for PCT Application No. PCT/JP2016/000783.
Singapore Office Action for SG Application No. 11201706695S dated Apr. 10, 2018.
Japanese Office Action for JP Application No. 2017-538442 dated Oct. 8, 2019 with English Translation.
Japanese Office Action for JP Application No. 2017-538442 dated Dec. 24, 2019 with English Translation.
U.S. Office Action for U.S. Appl. No. 16/354,323 dated Sep. 6, 2019.
U.S. Office Action for U.S. Appl. No. 15/546,717 dated Nov. 14, 2019.
Japanese Office Action for JP Application No. 2017-538442 dated Mar. 17, 2020 with English Translation.
U.S. Office Action for U.S. Appl. No. 15/546,717 dated Mar. 5, 2020.
U.S. Office Action for U.S. Appl. No. 16/354,323 dated Mar. 19, 2020.
Japanese Office Action for JP Application No. 2020-028048 dated Oct. 20, 2020 with English Translation.
U.S. Office Action for U.S. Appl. No. 15/546,717 dated Aug. 21, 2020.

\* cited by examiner

| DESTINATION | SIZE OF EVENT |
|---|---|
| POLICE | SMALL |
| FIRE AND AMBULANCE SERVICE DIVISION | MEDIUM |
| COUNTER TERRORISM ACTION GROUP | LARGE |
| *** | *** |
| *** | *** |
| *** | *** |

SYSTEM FOR MONITORING EVENT RELATED DATA

The present application is a Continuation application of Ser. No. 15/546,717 filed on Jul. 27, 2017, which is a National Stage Entry of PCT/JP2016/000783 filed on Feb. 16, 2016, which claims priority from Singapore Patent Application 10201501222X filed on Feb. 17, 2015, the contents of all of which are incorporated herein by reference, in their entirety.

TECHNICAL FIELD

The invention relates to a surveillance system. More specifically, the invention relates to a system for monitoring event related data.

BACKGROUND ART

Surveillance systems such as video surveillance systems have been used in several areas for routine surveillance and for event detection. Abnormal events such as terrorism, riot, theft, fighting, fire, car accidents, etc. are meant to be captured by such surveillance systems.

However, in some situations, a surveillance camera cannot capture abnormal events within the surveillance area at an appropriate size to adequately cover the abnormal event. Therefore, users, including security officers and police officers, are not able to understand an incident appropriately because a surveillance camera captures only a part of the whole of the event.

Thus, what is needed and an object of the disclosure is to provide an improved surveillance system that captures abnormal events within a surveillance area at a size appropriate to the abnormal event. Furthermore, other desirable features and characteristics will become apparent from the subsequent detailed description and the appended claims, taken in conjunction with the accompanying drawings and this background of the disclosure.

SUMMARY OF INVENTION

In a first aspect of the present invention, a system for monitoring event related data including a sensor data analyzer, an event analyzer and an actuator is disclosed. The sensor data analyzer detects events based on sensor data. The event analyzer is coupled to the sensor data analyzer and estimates the size of the entire detected events based on event related data of the detected events from the sensor data analyzer. The actuator is coupled to the sensor data analyzer and the event analyzer and actuates a predetermined device based on the estimated size of the entire detected events.

In a second aspect of the present invention, a method for monitoring event related data is disclosed. The method includes detecting events based on sensor data; estimating the size of the entire detected events based on event related data of the detected events; and actuating a predetermined device based on the estimated size of the entire detected events.

In addition, the object is also achieved by a computer program that achieves the method for monitoring event related data having the above-described configurations with a computer, and a computer-readable recording medium that stores the computer program.

BRIEF DESCRIPTION OF DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with the present embodiment.

Skilled artisans will appreciate that elements in the figures are illustrated for simplicity and clarity and have not necessarily been depicted to scale. For example, the dimensions of some of the elements in the simulation visualization or steps in the flowcharts may be exaggerated in respect to other elements to help improve understanding of the present embodiment.

DESCRIPTION OF EMBODIMENTS

The following detailed description is merely exemplary in nature and is not intended to limit the invention or the application and uses of the invention. Furthermore, there is no intention to be bound by any theory presented in the preceding background of the invention or the following detailed description. It is the intent of the following embodiments to present an improved method for monitoring event related data.

First Exemplary Embodiment

Figure 1:
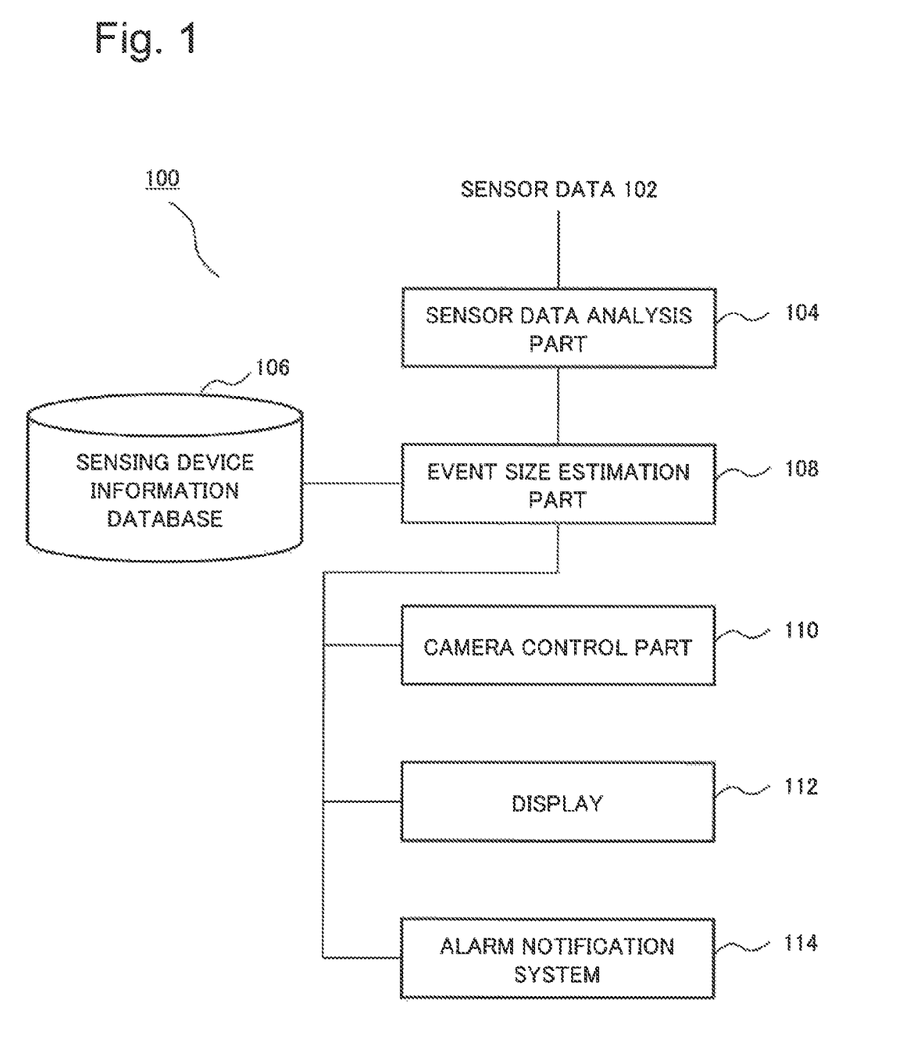
FIG. 1 depicts a block diagram of a video surveillance system in accordance with a first exemplary embodiment.

FIG. 1 depicts a block diagram of a video surveillance system 100 in accordance with a present embodiment. The video surveillance system 100 includes a sensor data analysis part 104, an event size estimation part 108 and a camera control part 110. The sensor data analysis part 104 receives sensor data 102 captured by sensing device(s), and detects an abnormal event with related information, including the detected time, within a surveillance area. The event size estimation part 108 is coupled to the sensor data analysis part 104 and estimates the size of the entire detected event using a time series of the detected event and sensing device information, including the device location stored within a sensing device information database 106. The camera control part 110 controls the surveillance camera (e.g. zoomingin, zooming-out, changing the direction of the camera) based on the estimated size of the entire detected event. Alternatively, a display 112 may show information based on the estimated size of the entire detected event. Also, an alarm notification system 114 may send alarm to a predetermined destination based on the estimated size of the entire detected event. In an example, the system 100 may include one or more of the following predetermined device: a camera control part 110, a display 112 and an alarm notification system 114.

The event size estimation part 108 advantageously estimates the appropriate size of entire detected events. And then, an actuator actuates a predetermined sensing device to facilitate understanding of the situation. In one example, the surveillance camera captures the whole event and facilitates security officers to understand the situation quickly. Alternatively, a display device shows the estimated size of entire detected events on a map to assist security officers to understand the situation quickly. Users may customize the predetermined device to actuate in a predetermined manner in response to detection of predetermined situations.

Also, the size estimation of entire detected events is based on the type of events detected by the sensor data analysis part 104. For example, if the type of detected event is an explosion, the size of the entire detected event is considered large. Thus, an actuator actuates a predetermined device taking into account the large size of the entire detected event. Therefore, users, including security officers and police officers, are able to understand an incident appropriately since a surveillance camera or other devices are adjusted automatically based on the size of the incident (abnormal event) to capture the whole of the event. The present embodiment enables the users to deal with the incident quickly and properly. The users may customize the size of the event corresponding to the type of event. The users are also able to investigate the incident using the appropriate video footage after the incident.

Figure 2:
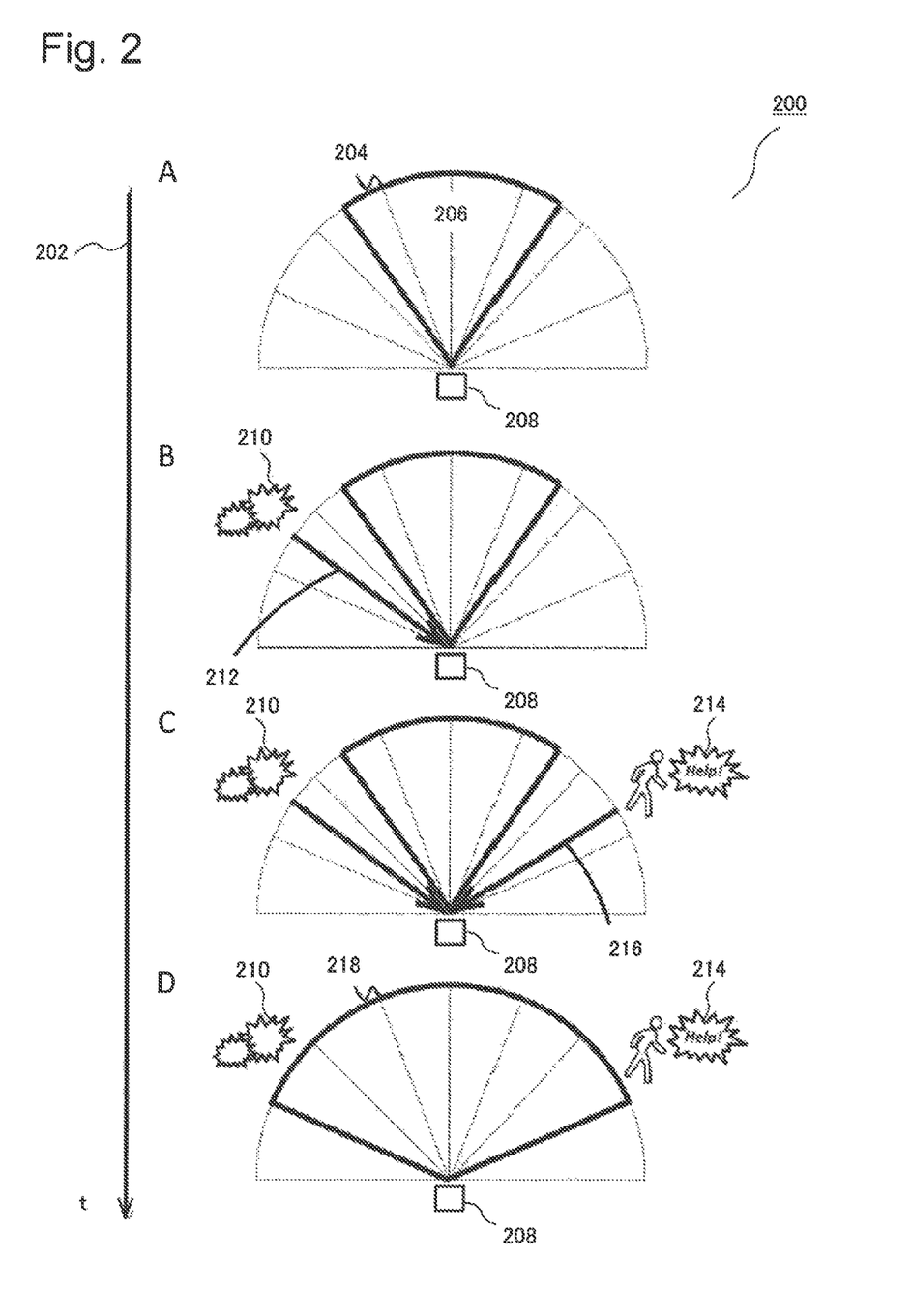
FIG. 2 depicts an example of imaging range adjustment based on sound (zoom-out) in accordance with the first exemplary embodiment.

FIG. 2 depicts an imaging range adjustment based on sound (zoom-out) 200 in accordance with a present embodiment. Timeline 202 shows 4 steps (A to D) for the imaging range adjustment 200. At step A, Field of View 206 of a camera and microphone array 208 is set at an initial imaging range 204. At step B, the camera and microphone array 208 captures sounds of breaking glass 210 from a direction of arrival 212. At step C, the camera and microphone array 208 further captures sounds of shouting 214 from a direction of arrival 216. At step D, the event size estimation part 108 estimates the size of the event by calculating both right and left maximum angles for Field of View within the direction of the camera in the camera and microphone array 208 and within a predetermined time width. Then, the camera control part 110 controls the camera in the camera and microphone array 208 by comparing the current setting of the camera with the estimated size of the event consisting of the maximum angles and Field of View 206 of the camera and microphone array 208 to cause the camera and microphone array 208 to zoom-out to adjusted imaging range 218.

Figure 3:
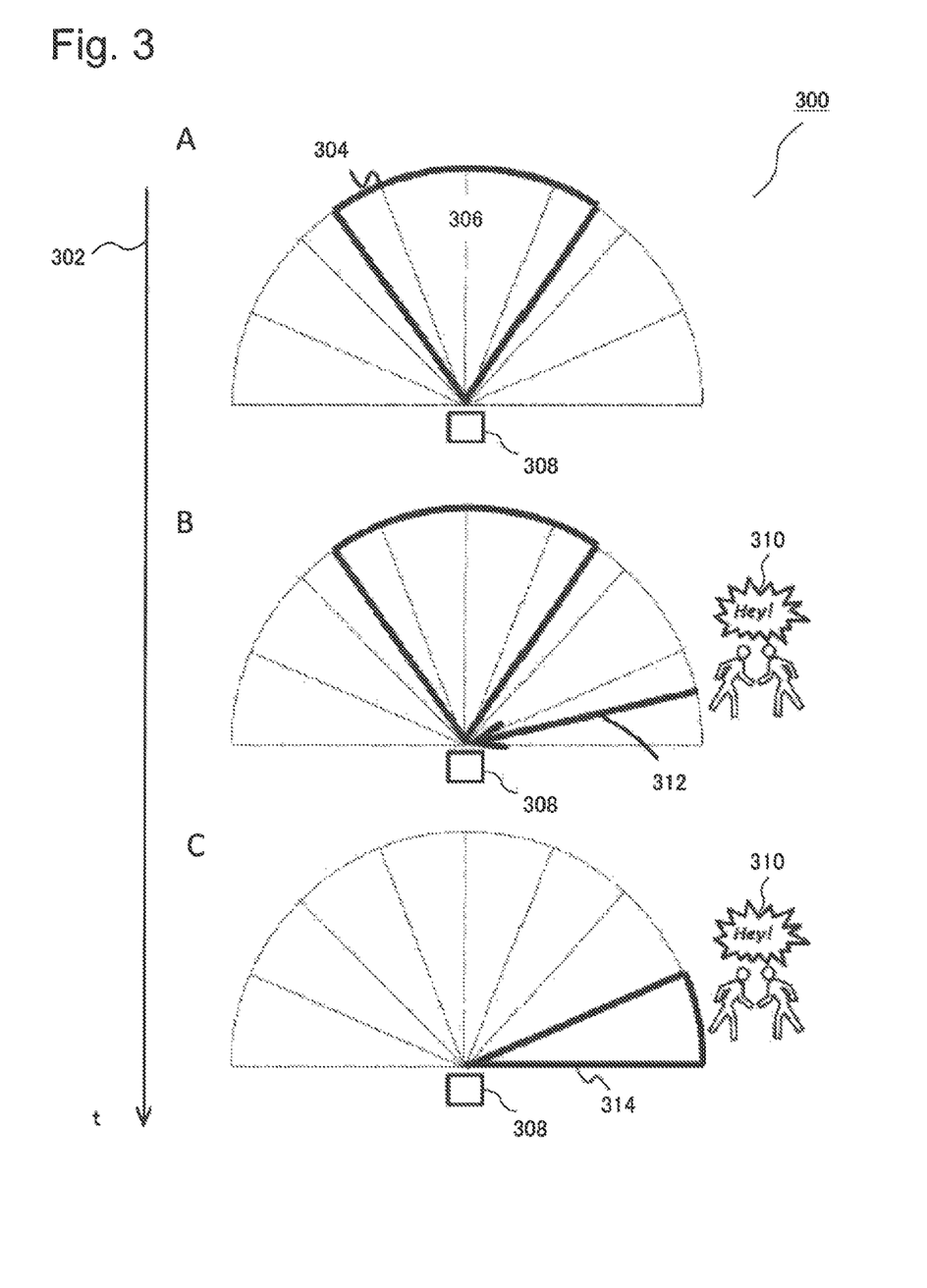
FIG. 3 illustrates an example of imaging range adjustment based on sound (zoom-in and controlling the direction of the camera) in accordance with the first exemplary embodiment.

FIG. 3 depicts an imaging range adjustment based on sound (zoom-in and controlling the direction of the camera) 300. Timeline 302 shows three steps (A to C) for the imaging range adjustment 300. At step A, a Field of View 306 of a camera and microphone array 308 is set at an initial adjustment range 304. At step B, the camera and microphone array 308 captures sounds of fighting 310 from a direction of arrival 312. At step C, the event size estimation part 108 estimates the size of the event by calculating both right and left maximum angles for Field of View within the direction of the camera and microphone array 308 and within a predetermined time width. Then, the camera control part 110 controls the camera and microphone array 308 by comparing the current setting of the camera with the estimated size of the event consisting of the maximum angles to cause the camera and microphone array 308 to control the direction and Field of View of the camera to rotate and zoom-in to an adjusted imaging range 314.

Figure 4:
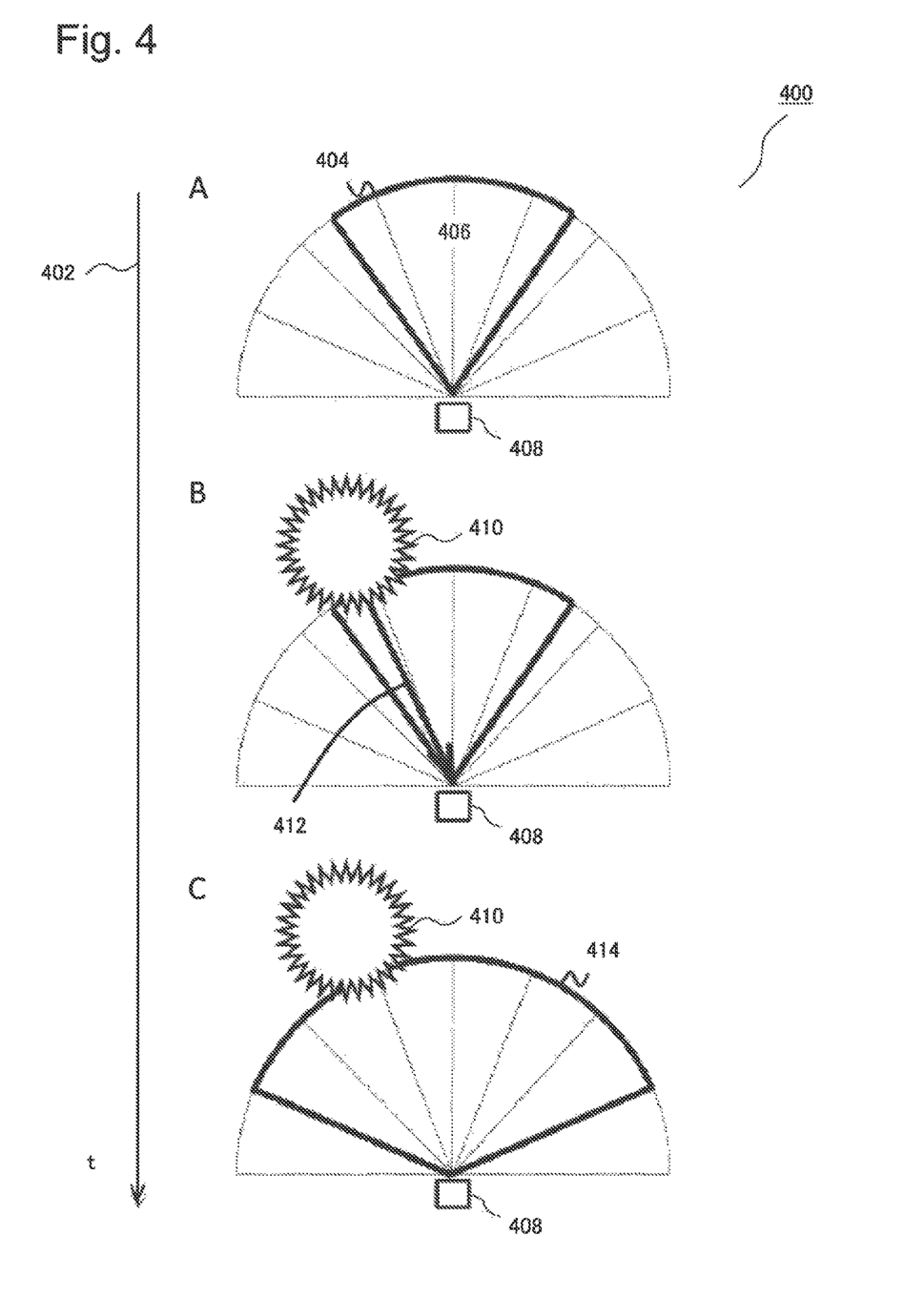
FIG. 4 depicts an example of imaging range adjustment based on the type of sound event (zooming-out) in accordance with the first exemplary embodiment.

FIG. 4 depicts an imaging range adjustment based on the type of sound event (zoom-out) 400. Timeline 402 shows three steps (A to C) for the imaging range adjustment 400. At step A, a Field of View 406 of a camera and microphone array 408 is set at an initial adjustment range 404. At step B, the camera and microphone array 408 captures a sound of an explosion 410 from a direction of arrival 412. At step C, the event size estimation part 108 estimates the size of the event by the type of event (e.g. when the sensor data analysis part 104 detects a large-scale event like the explosion 410, the event size estimation part 108 decides the size of the event is "Large"). Then, the camera control part 110 controls the camera of the camera and microphone array 408 in response to the received size of the event. When the size is "Large", the camera control part 110 zooms out the camera to a predetermined setting (the widest setting). Then, the camera control part 110 controls the direction and Field of View of camera to zoom-out to adjusted imaging range 414. When the sensor data analysis part 104 detects a small-scale event like the theft, the event size estimation part 108 can decide the size of the event is "Small". Also, when the sensor data analysis part 104 detects a medium-scale event like the fire, the event size estimation part 108 can decide the size of the event is "Medium".

Figure 5:
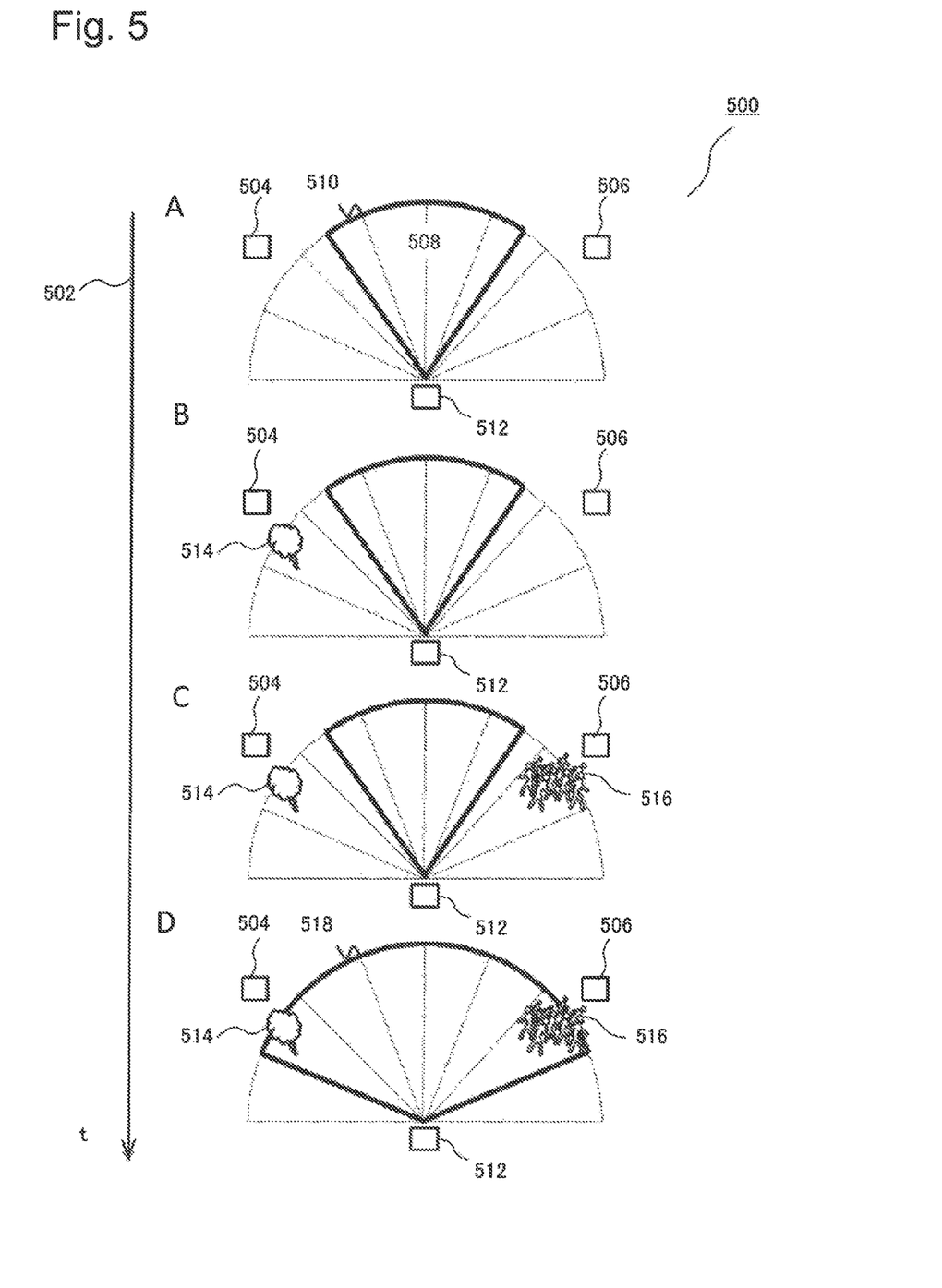
FIG. 5 depicts an example of imaging range adjustment using an odor sensor and infrared sensor (zooming-out) in accordance with the first exemplary embodiment.

FIG. 5 depicts an imaging range adjustment using an odor sensor and infrared sensor (zoom-out) 500. Timeline 502 shows four steps (A to D) for the imaging range adjustment 500. At step A, a Field of View 508 of a camera and microphone array 512 is set at an initial adjustment range 510. The sensor data analysis part 104 may receive sensor data captured by any sensing device, such as an odor sensor 504 and an infrared sensor 506, to detect abnormal events. At step B, an abnormal odor 514 is detected at the odor sensor 504 within a detected time. At step C, an unusual crowd 516 is detected at the infrared sensor 506. At step D, the event size estimation part 108 estimates the size of the event by calculating both right and left maximum angles for Field of View within the direction of the camera and within a predetermined time width using the sensor's location information. Then, the camera control part 110 controls the surveillance camera by comparing the current setting of the camera with the estimated size of the event consisting of the maximum angles. The camera control part 110 then controls the camera and microphone array 512 to zoom-out to an adjusted imaging range 518.

Figure 6:
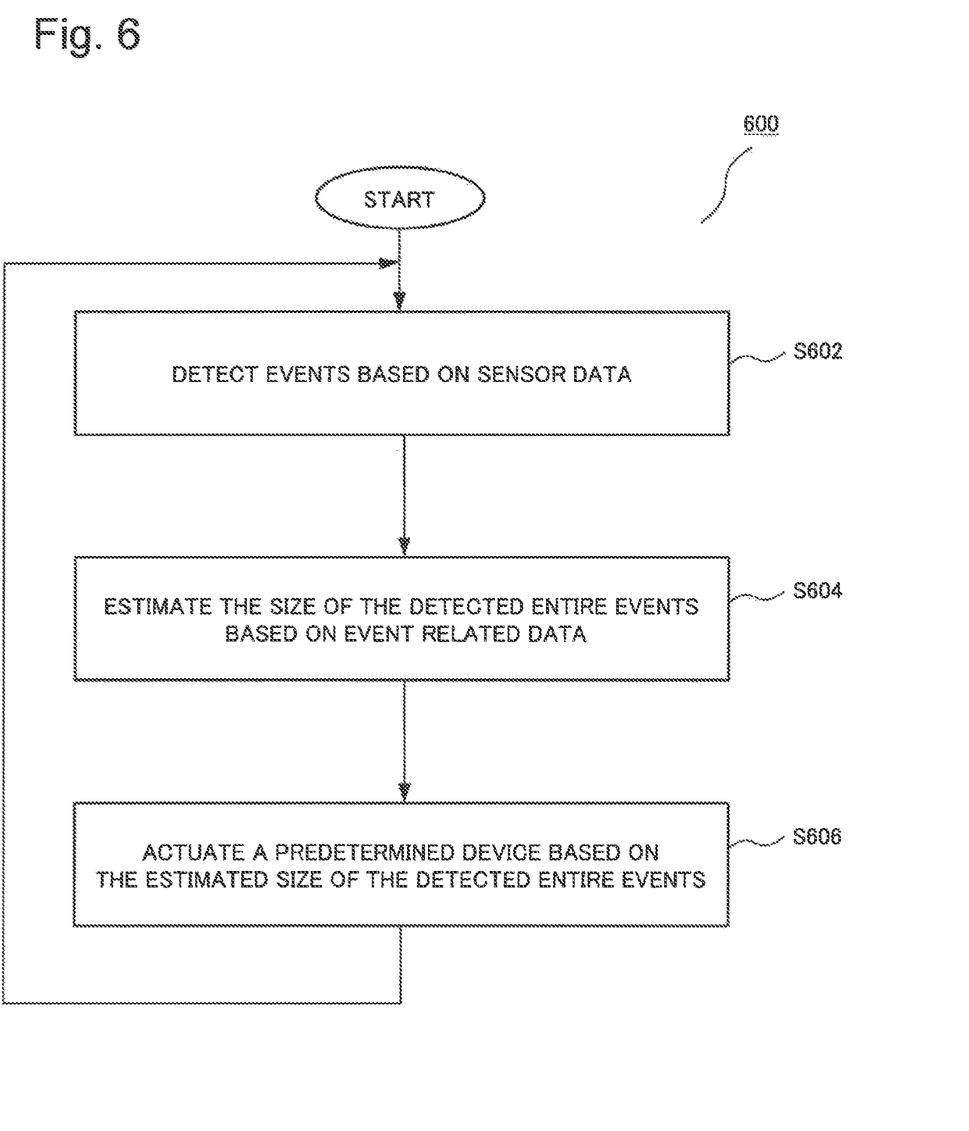
FIG. 6 depicts a flowchart of a method of monitoring event related data in accordance with the first exemplary embodiment.

FIG. 6 depicts a flowchart 600 of a method for monitoring event related data in accordance with a present embodiment. A sensor data analyzer detects events based on sensor data (S602). Based on the event related data of the detected events, the size of the detected entire events is estimated (S604). Then, a predetermined device is actuated based on the estimated size of the detected entire events (S606).

Figure 7:
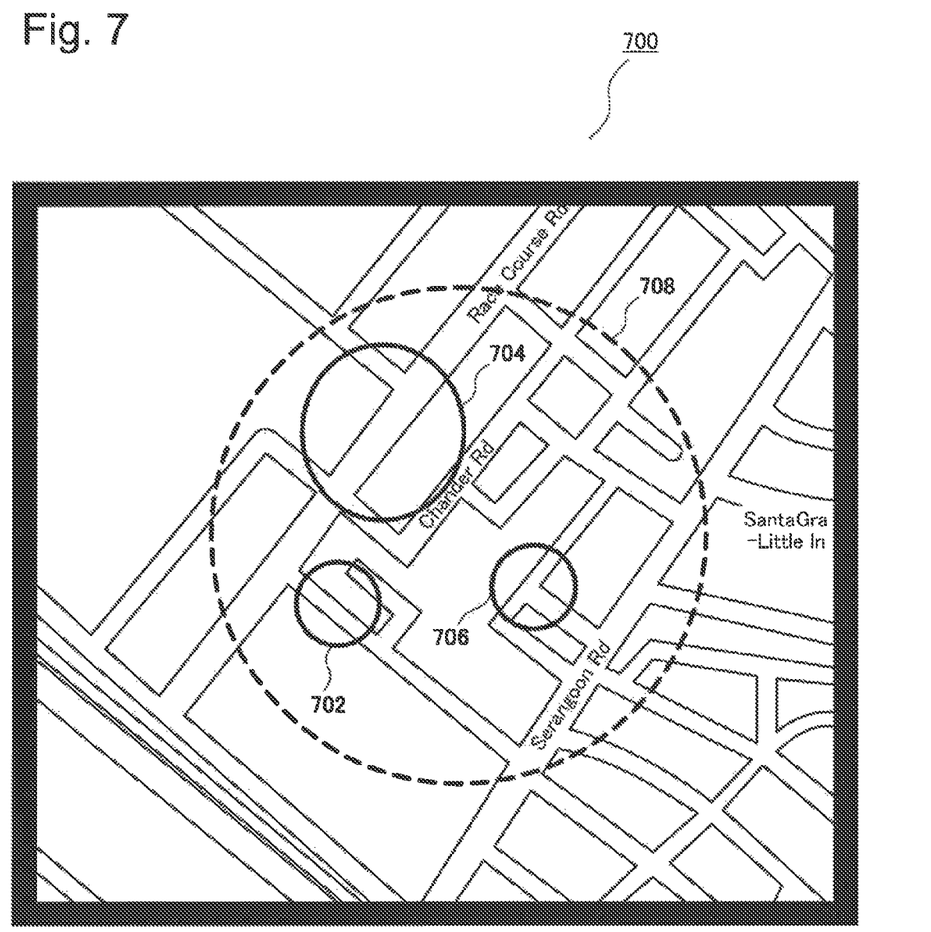
FIG. 7 depicts a display showing the estimated size of the detected entire events on a map in accordance with the first exemplary embodiment.

FIG. 7 depicts a display 700 showing the size of the detected entire events on a map in accordance with a present embodiment. In the present embodiment, sounds of breaking glass 702 are detected by a sensor, such as a microphone. Next, crowds 704 are detected by a sensor, such as an infrared sensor. After that sounds of fighting 706 are detected by a sensor such as a microphone. Based on these event related data, the geographical size of the detected entire events 708 is estimated by the event size estimation part 108. A display 700 may be actuated to show the estimated size of the detected entire events on a map.

Figure 8:
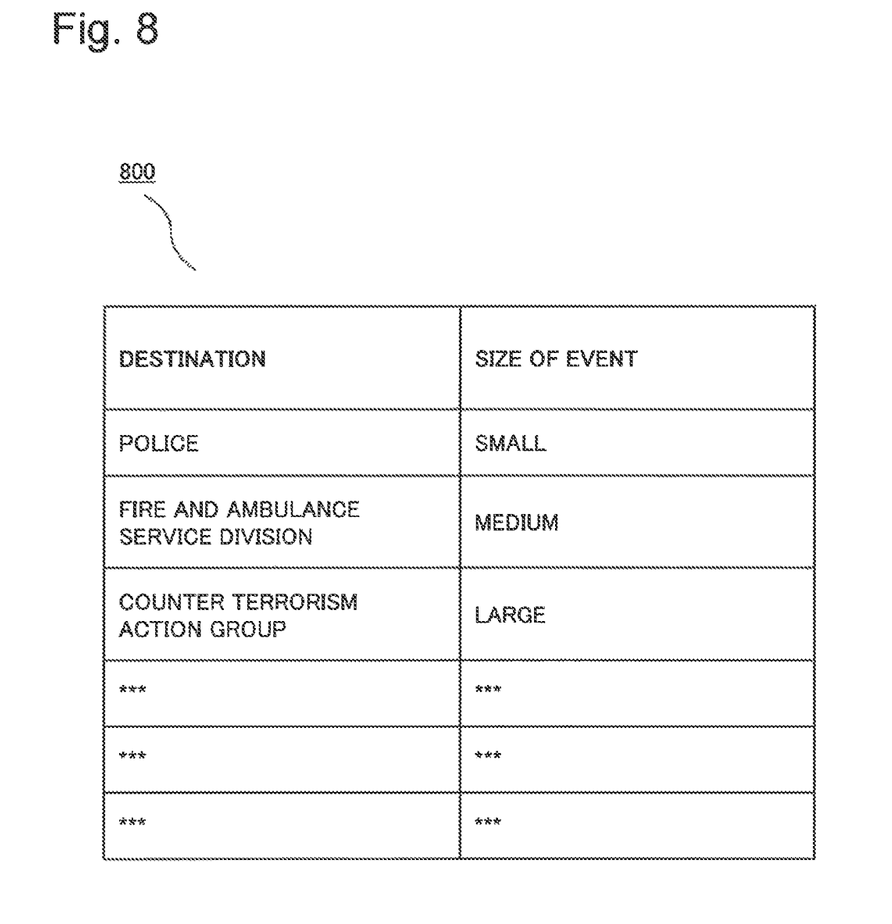
FIG. 8 depicts a look-up table for alarm notification system in accordance with the first exemplary embodiment.

FIG. 8 depicts a look-up table 800 for alarm notification system 114 in accordance with a present embodiment. In the present embodiment, an event or a plurality of events are detected by one or more sensors. Based on the event related data from the sensors, the size of the detected entire events is estimated by the event size estimation part. The actuator actuates an alarm notification system 114 so that the alarm notification system 114 selects a notification destination based on the estimated size of the detected entire events. For example, if the estimated size of the detected entire events is 'Small', the alarm notification system 114 refers to a look-up table 800 and selects 'Police' as a notification destination. Then, the alarm notification system 114 sends alarm to 'Police'. Alternatively, if the estimated size of the detected entire events is 'Medium' or 'Large', the alarm notification system 114 selects 'Fire and Ambulance Service Division' or 'Counter-Terrorism Action Group' as a notification destination based on the look-up table 800. Users may customize the notification destination and size of the detected entire events in the look-up table 800.

Second Exemplary Embodiment

Figure 9:
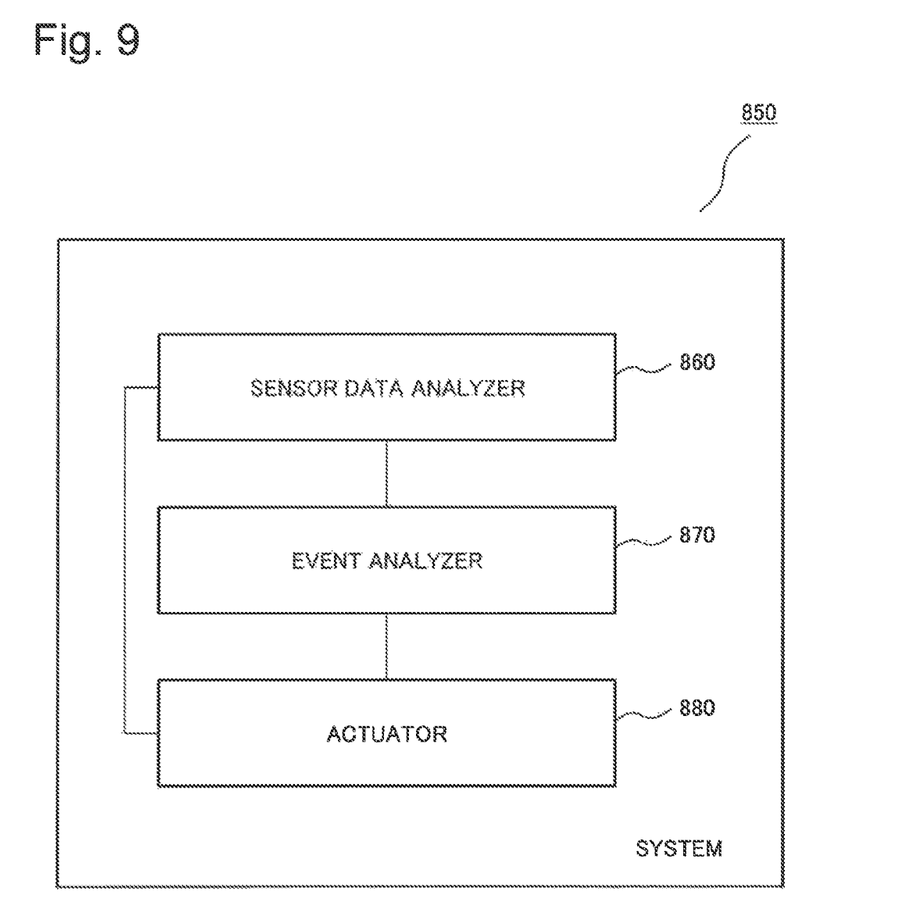
FIG. 9 depicts a block diagram of a system in accordance with a second exemplary embodiment.

FIG. 9 depicts a block diagram of a system 850 in accordance with the second exemplary embodiment. The system 850 includes a sensor data analyzer 860, an event analyzer 870 and an actuator 880. The sensor data analyzer 860 detects events based on sensor data. The event analyzer 870 is coupled to the sensor data analyzer 860 and estimates the size of the detected entire events based on event related data of the detected events from the sensor data analyzer 860. The actuator 880 is coupled to the sensor data analyzer 860 and the event analyzer 870 and actuates a predetermined device based on the estimated size of the detected entire events.

The sensor data analyzer 860 includes the sensor data analysis part 104 of the first exemplary embodiment. The event analyzer 870 and the actuator 880 include the event size estimation part 108 of the first exemplary embodiment.

By the above-described configuration, according to the second exemplary embodiment, the improved system that can capture abnormal events within a surveillance area at a size appropriate to the abnormal event can be provided.

Figure 10:
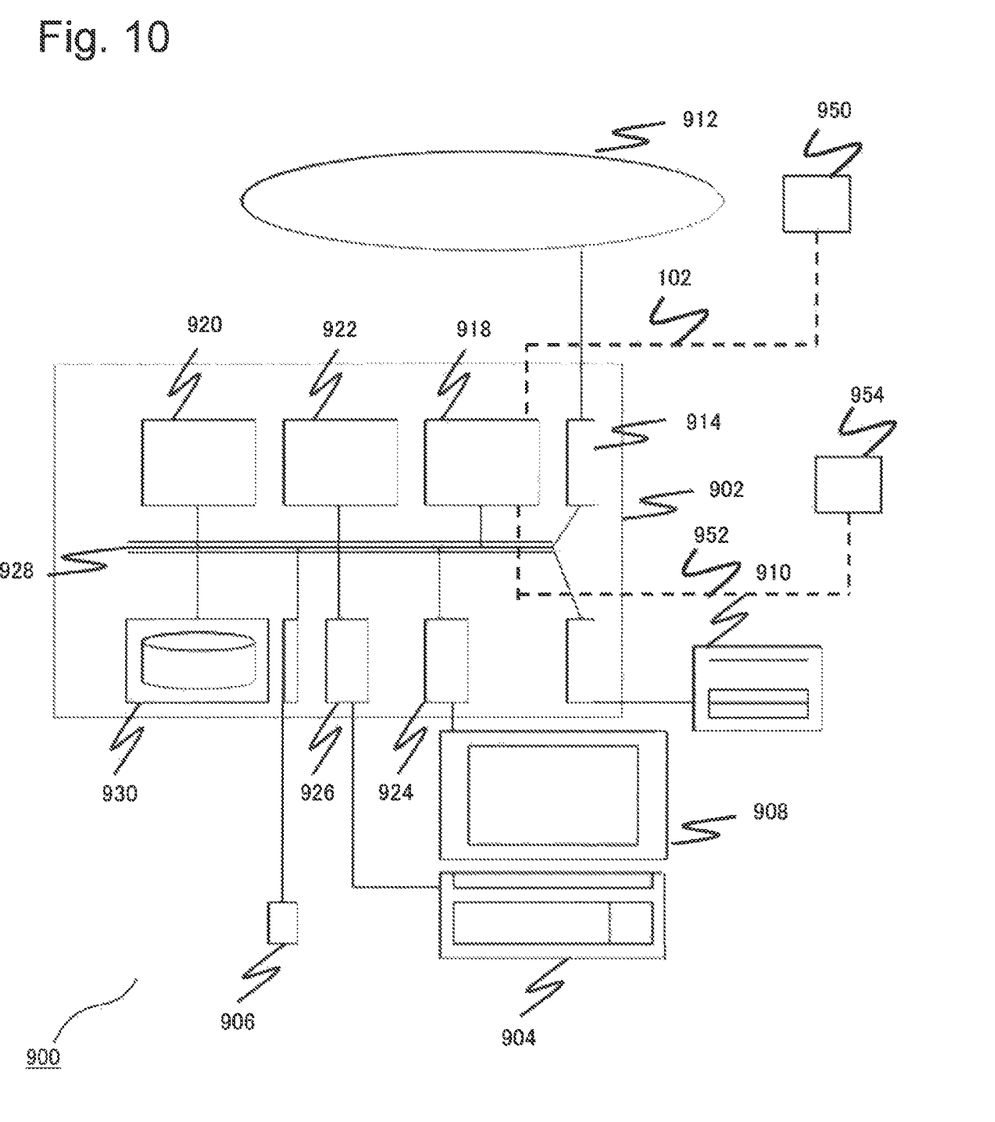
FIG. 10 depicts a computer system for implementing a method of monitoring event related data in accordance with the first and the second exemplary embodiment.

The method and system of the described exemplary embodiments can be implemented on a computer system 900, schematically shown in FIG. 10. It may be implemented as software, such as a computer program being executed within the computer system 900, and instructing the computer system 900 to conduct the method of the example embodiments.

Some portions of the description which follows are explicitly or implicitly presented in terms of algorithms and functional or symbolic representations of operations on data within a computer memory. These algorithmic descriptions and functional or symbolic representations are the means used by those skilled in the data processing arts to convey most effectively the substance of their work to others skilled in the art. An algorithm is here, and generally, conceived to be a self-consistent sequence of steps leading to a desired result. The steps are those requiring physical manipulations of physical quantities, such as electrical, magnetic or optical signals capable of being stored, transferred, combined, compared, and otherwise manipulated.

Unless specifically stated otherwise, and as apparent from the following, it will be appreciated that throughout the present specification, discussions utilizing terms such as "scanning", "calculating", "determining", "replacing", "generating", "initializing", "outputting", or the like, refer to the action and processes of a computer system, or similar electronic device, that manipulates and transforms data represented as physical quantities within the computer system into other data similarly represented as physical quantities within the computer system or other information storage, transmission or display devices.

The present specification also discloses apparatus for performing the operations of the methods. Such apparatus may be specially constructed for the required purposes, or may comprise a general purpose computer or other device selectively activated or reconfigured by a computer program stored in the computer. The algorithms and displays presented herein are not inherently related to any particular computer or other apparatus. Various general purpose machines may be used with programs in accordance with the teachings herein. Alternatively, the construction of more specialized apparatus to perform the required method steps may be appropriate. The structure of a conventional general purpose computer will appear from the description below.

In addition, the present specification also implicitly discloses a computer program, in that it would be apparent to the person skilled in the art that the individual steps of the method described herein may be put into effect by computer code. The computer program is not intended to be limited to any particular programming language and implementation thereof. It will be appreciated that a variety of programming languages and coding thereof may be used to implement the teachings of the disclosure contained herein. Moreover, the computer program is not intended to be limited to any particular control flow. There are many other variants of the computer program, which can use different control flows without departing from the spirit or scope of the invention.

Furthermore, one or more of the steps of the computer program may be performed in parallel rather than sequentially. Such a computer program may be stored on any computer readable medium. The computer readable medium may include storage devices such as magnetic or optical disks, memory chips, or other storage devices suitable for interfacing with a general purpose computer. The computer readable medium may also include a hard-wired medium such as exemplified in the Internet system, or wireless medium such as exemplified in the GSM (Global System for Mobile communications) mobile telephone system. The computer program when loaded and executed on such a general-purpose computer effectively results in an apparatus that implements the steps of the preferred method.

The computer system 900 comprises a computer module 902, input modules such as a keyboard 904 and mouse 906 and a plurality of output devices such as a display 908, and printer 910.

The computer module 902 is connected to a computer network 912 via a suitable transceiver device 914, to enable access to e.g. the Internet or other network systems such as Local Area Network (LAN) or Wide Area Network (WAN).

The computer module 902 in the example includes a processor 918, a Random Access Memory (RAM) 920 and a Read Only Memory (ROM) 922. The computer module 902 also includes a number of Input/Output (I/O) interfaces, for example I/O interface 924 to the display 908, and I/O interface 926 to the keyboard 904.

The components of the computer module 902 typically communicate via an interconnected bus 928 and in a manner known to the person skilled in the relevant art.

The application program is typically supplied to the user of the computer system 900 encoded on a data storage medium such as a CD (Compact-Disc)-ROM or flash memory carrier and read utilising a corresponding data storage medium drive of a data storage device 930. The application program is read and controlled in its execution by the processor 918. Intermediate storage of program data may be accomplished using RAM 920.

The processor 918 may execute a set of instructions that perform the method claimed with respect to FIG. 6. The processor 918 is configured to receive sensor data 102 captured by the sensing devices disclosed with regard to FIG. 1. The sensor data 102 may be received by sensors 950 that are located at e.g. a remote surveillance area. The processor 918 is configured to analyze the sensor data 102 to detect event(s) and event related data. Based on the event related data of the detected event(s), the processor 918 is configured to estimate the size of the detected entire events. The processor 918 sends out actuation data 952 to one or more actuators 954 so that the one or more actuators 954 can actuate one or more predetermined devices such as a camera, a display and an alarm notification system. The one or more predetermined devices are actuated based on the estimated size of the detected entire events.

While exemplary embodiments have been presented in the foregoing detailed description of the invention, it should be appreciated that a vast number of variations exist. For example, those skilled in the art will realize from the teachings herein that the present technology may also be applied to any part in the other type of chemical sensors.

It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention. It is understood that various changes may be made in the function and arrangement of elements and method of operation described in an exemplary embodiment without departing from the scope of the invention as set forth in the appended claims.

A part or the whole of the foregoing exemplary embodiment and the variations thereof may be defined as a supplementary note cited hereunder. However, the exemplary embodiment and the variations are not limited to the following supplementary note.

Supplementary Note 1

A non-transitory computer readable storage medium storing the program that causes a computer to perform:
a process that detects events based on sensor data by a sensor data analyzer;
a process that estimates the size of the detected entire events based on event related data of the detected events; and
a process that actuates a predetermined device based on the estimated size of the detected entire events.

This application is based upon and claims the benefit of priority from Singapore Patent Application No. 10201501222X filed on Feb. 17, 2015, the entire disclosure of which is incorporated herein.

INDUSTRIAL APPLICABILITY

The present invention can be applied to, for example, video surveillance systems which are used in several areas for routine surveillance.

REFERENCE SINGS LIST

100 Video surveillance system
102 Sensor data
104 Sensor data analysis part
106 Sensing device information database
108 Event size estimation part
110 Camera control part
112 Display
114 Alarm notification system
200 Imaging range adjustment (zoom-out)
202 Timeline
204 Initial imaging range
206 Field of View
208 Camera and microphone array
210 Breaking glass
212 Direction of arrival
214 Shouting
216 Direction of arrival
218 Adjusted imaging range
300 Imaging range adjustment based on sound (zoom-in and controlling the direction of the camera)
302 Timeline
304 Initial adjustment range
306 Field of View
308 Camera and microphone array
310 Fighting
312 Direction of arrival
314 Adjusted imaging range
400 Imaging range adjustment based on the type of sound event (zooming-out)
402 Timeline
404 Initial adjustment range
406 Field of View
408 Camera and microphone array
410 Explosion
412 Direction of arrival
414 Adjusted imaging range
500 Imaging range adjustment using an odor sensor and infrared sensor (zooming-out)
502 Timeline
504 Odor sensor
506 Infrared sensor
508 Field of View
510 Initial adjustment range
512 Camera and microphone array
514 Abnormal odor
516 unusual crowd
518 Adjusted imaging range
600 Flowchart of the method for monitoring event related data
602 Step of detecting events
604 Step of estimating the size of the detected entire event
606 Step of actuating predetermined device based on the estimated size of event
700 Display
702 Breaking glass
704 Crowd
706 Fighting
708 Size of the detected entire events
800 Look-up table 900 Computer system
902 Computer module
904 Keyboard
906 Mouse
908 Display
910 Printer
912 Computer network
914 Suitable transceiver device
918 Processor
920 Random Access Memory (RAM)
922 Read Only Memory (ROM)
924 I/O interface to display
926 I/O interface to keyboard
928 Interconnected bus
930 Data storage device
950 Sensors
952 Actuation data
954 Actuators

The invention claimed is:

1. A control system comprising:
at least one memory storing instructions; and
at least one processor coupled to the at least one memory, the at least one processor configured to execute the instructions to:
detect that an event occurred in a surveillance area by using sensor data;
identify a type of the detected event; and
control a predetermined imaging range of a camera depending on the identified type of the detected event in the surveillance area,
wherein varieties of imaging ranges, including the imaging varieties of types, including the type, correspond to each other, and
wherein the varieties of the imaging ranges are defined differently depending on the type.

2. The control system according to claim 1, wherein the at least one processor is further configured to execute the instructions to control the imaging range based on a type of a sound event.

3. The control system according to claim 1, wherein a number of the varieties of the imaging range, which is defined by a control by the at least one processor, is not less than three.

4. The control system according to claim 1, wherein the processor is further configured to:
detect an abnormal odor as the event based on the sensor data provided by an odor sensor; and
set the imaging range to a range depending on a location of the odor sensor.

5. The control system according to claim 1, wherein the processor is further configured to:
detect an unusual crowd as the event based on the sensor data provided by an infrared sensor; and
set the imaging range to a range depending on a location of the infrared sensor.

6. A control method comprising:
detecting that an event occurred in a surveillance area by using sensor data;
identifying a type of the detected event; and
controlling a predetermined imaging range of a camera depending on the identified type of the detected event in the surveillance area,
wherein varieties of imaging ranges, including the imaging range, and varieties of types, including the type correspond to each other, and
wherein the varieties of the imaging ranges are defined differently depending on the type.

7. The control method according to claim 6, further comprising controlling the imaging range based on a type of a sound event.

8. The control method according to claim 6, wherein a number of the varieties of the imaging range, which is defined by the controlling, is not less than three.

9. The control method according to claim 6, further comprising:
detecting an abnormal odor as the event based on the sensor data provided by an odor sensor; and
setting the imaging range to a range depending on a location of the odor sensor.

10. The control method according to claim 6, further comprising:
detecting an unusual crowd as the event based on the sensor data provided by an infrared sensor; and
setting the imaging range to a range depending on a location of the infrared sensor.

11. A non-transitory computer-readable storage medium storing a program that causes a computer to perform:
detecting that an event occurred in a surveillance area by using sensor data;
identifying a type of the detected event; and
controlling a predetermined imaging range of a camera depending on the identified type of the detected event in the surveillance area,
wherein varieties of imaging ranges, including the imaging range, and varieties of the types, including the type, correspond to each other, and
wherein the varieties of the imaging ranges are defined differently depending on the type.

12. The storage medium according to claim 11, wherein the program further causes the computer to perform controlling the imaging range based on a type of a sound event.

13. The storage medium according to claim 11, wherein a number of the varieties of the imaging range, which is defined by the controlling, is not less than three.

14. The storage medium according to claim 11, wherein the program further causes the computer to perform:
detecting an abnormal odor as the event based on the sensor data provided by an odor sensor; and
setting the imaging range to a range depending on a location of the odor sensor.

15. The storage medium according to claim 11, wherein the program further causes the computer to perform:
detecting an unusual crowd as the event based on the sensor data provided by an infrared sensor; and
setting the imaging range to a range depending on a location of the infrared sensor.

* * * * *

UNITED STATES PATENT AND TRADEMARK OFFICE
CERTIFICATE OF CORRECTION

| | |
|---|---|
| PATENT NO. | : 10,970,995 B2 |
| APPLICATION NO. | : 16/354297 |
| DATED | : April 6, 2021 |
| INVENTOR(S) | : Masahiro Tani and Takeshi Arikuma |

It is certified that error appears in the above-identified patent and that said Letters Patent is hereby corrected as shown below:

In the Claims

Claim 1 should read:
1. A control system comprising:
    at least one memory storing instructions; and
    at least one processor coupled to the at least one memory; the at least one processor configured to execute the instructions to:
    detect that an event occurred in a surveillance area by using sensor data;
    identify a type of the detected event; and
    control a predetermined imaging range of a camera depending on the identified type of the detected event in the surveillance area;
    wherein varieties of imaging ranges; including the imaging range; and varieties of types; including the type; correspond to each other; and
    wherein the varieties of the imaging ranges are defined differently depending on the type.

Signed and Sealed this
Nineteenth Day of August, 2025

Coke Morgan Stewart
*Acting Director of the United States Patent and Trademark Office*